UNITED STATES PATENT OFFICE.

CARL COUTELLE AND ARNOLD MORÉ, OF ELBERFELD, GERMANY, ASSIGNORS TO SYNTHETIC PATENTS CO., INC., OF NEW YORK, N. Y., A CORPORATION OF NEW YORK.

METAL SALTS OF POLYMETHYLENEBISIMINO ACIDS.

1,150,579.     Specification of Letters Patent.     Patented Aug. 17, 1915.

No Drawing.     Application filed October 16, 1913. Serial No. 795,475.

*To all whom it may concern:*

Be it known that we, CARL COUTELLE and ARNOLD MORÉ, doctors of philosophy, chemists, citizens of the German Empire, residing at Elberfeld, Germany, have invented new and useful Improvements in Metal Salts of Polymethylenebisimino Acids, of which the following is a specification.

We have found that polymethylenebisimino acids, containing at least 4 methylene groups, or their homologues, such as,

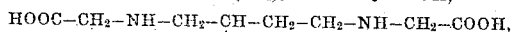

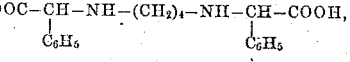

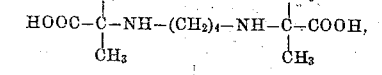

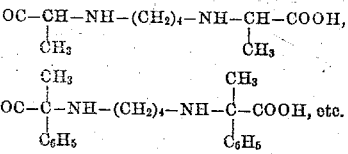

form heavy metal salts, such as copper or zinc salts which have proved to be valuable remedies against infectious diseases, especially against tuberculosis.

The polymethylenebisimino acids themselves can be produced by allowing polymethylene-diamins or their homologues to react on cyanids and aldehydes or ketones to form dinitrils which are saponified to give the free acids. The production of these acids however is not claimed in the present application.

The following examples are given of how much acids can be prepared.

*Production of tetra-methylene-bis-imino acetic acid.*—176 parts of tetra-methylene-diamin are neutralized with dilute hydrochloric acid and then treated with a solution of 270 parts of cyanid of potassium in 400 parts of water. While cooling 300 parts of 40% formaldehyde are added drop by drop. On the addition of 500 parts of carbonate of potassium, the nitril of the tetra-methylene-bis-imino acid is precipitated as a semi-solid mass. The latter is treated with alcohol, evaporated, and on cooling a white crystalline mass of the melting point of 57° separates out. 170 parts of this nitril are boiled for 12 to 15 hours with 350 parts of hydrate of barium and 7,500 parts of water. After removing the baryta by means of an equivalent quantity of sulfuric acid, the solution, free from baryta, is evaporated whereupon by cooling the tetra-methylene-bis-iminoacetic acid is separated.

*Production of beta-methyl-tetra-methylene-bis-imino acetic acid.*—102 parts of beta-methyl-tetra-methylene-diamin are neutralized with dilute sulfuric acid. Then a solution of 140 parts of cyanid of calcium in 200 parts of water is added, and under cooling 150 parts of 40% formaldehyde are added, drop by drop. On treatment with 200 parts of carbonate of potassium the nitril is separated as light colored yellow oil. 90 parts of the nitril are boiled for 12 hours with 175 parts of hydrate of barium and 3,750 parts of water. After exactly neutralizing and removing the baryta with sulfuric acid and filtering off the sulfate of barium, the solution, free from barium, is evaporated and thus the beta-methyl-tetra-methylene-bis-imino acetic acid is obtained as a non-crystallizable syrup of honey yellow color.

In order to illustrate the new process more fully the following example is given, the parts being by weight:—Beta-methyltetra-methylenebisiminoacetic acid is boiled together with an excess of carbonate of copper in aqueous solution. The copper salt is filtered off and dried. It is a bluish crystalline compound soluble in water, but difficultly soluble in alcohol, ether, acetone. The new copper salt has most probably the following formula:

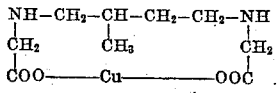

containing about 22 per cent. of copper.

We claim:

1. As new products, the metal salts of polymethylene bisimino acids containing at least four and not more than five methylene groups which are generally crystalline products soluble in water and generally soluble with difficulty in organic solvents and which are valuable therapeutics against infectious diseases, substantially as described.

2. As new products, the heavy metal salts of polymethylenebisimino acids containing at least four and not more than five methylene groups which are generally crystalline products soluble in water and generally soluble with difficulty in organic solvents and which are valuable therapeutics against infectious diseases, substantially as described.

3. As new products, the divalent metal salts of polymethylenebisimino acids containing at least four and not more than five methylene groups which are generally crystalline products soluble in water and generally soluble with difficulty in organic solvents and which are valuable therapeutics against infectious diseases, substantially as described.

4. As new products, the copper salts of polymethylenebisimino acids containing at least four and not more than five methylene groups which are generally crystalline products soluble in water and generally soluble with difficulty in organic solvents and which are valuable therapeutics against infectious diseases, substantially as described.

5. As new products, the metal salts of tetramethylenebisimino acids which are generally crystalline products soluble in water and generally soluble with difficulty in organic solvents and which are valuable therapeutics against infectious diseases, substantially as described.

6. As new products, the divalent metal salts of tetramethylenebisimino acids which are generally crystalline products soluble in water and generally soluble with difficulty in organic solvents and which are valuable therapeutics against infectious diseases, substantially as described.

7. As new products, the copper salts of tetramethylenebisimino acids which are generally crystalline products soluble in water and generally soluble with difficulty in organic solvents and which are valuable therapeutics against infectious diseases, substantially as described.

8. The new copper salt of beta-methyl-tetramethylenediamin having most probably the formula:

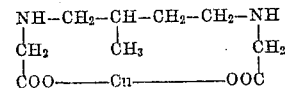

which crystallizes in light bluish needles soluble in water with a blue coloration, soluble with difficulty in alcohol, acetone, ether, etc., and being a valuable remedy against infectious diseases, substantially as described.

In testimony whereof we have hereunto set our hands in the presence of two subscribing witnesses.

CARL COUTELLE. [L. S.]
ARNOLD MORÉ. [L. S.]

Witnesses:
HELEN NUFER,
ALBERT NUFER.